(12) United States Patent
Yoo

(10) Patent No.: US 10,239,535 B2
(45) Date of Patent: Mar. 26, 2019

(54) ENGINE CONTROL DEVICE FOR HYBRID CONSTRUCTION MACHINERY

(71) Applicant: Doosan Infracore Co., Ltd., Incheon (KR)

(72) Inventor: Seung Jin Yoo, Seoul (KR)

(73) Assignee: Doosan Infracore Co., Ltd., Incheon (KR)

(*) Notice: Subject to any disclaimer, the term of this patent is extended or adjusted under 35 U.S.C. 154(b) by 400 days.

(21) Appl. No.: 14/655,910

(22) PCT Filed: Dec. 24, 2013

(86) PCT No.: PCT/KR2013/012066
§ 371 (c)(1),
(2) Date: Jun. 26, 2015

(87) PCT Pub. No.: WO2014/104698
PCT Pub. Date: Jul. 3, 2014

(65) Prior Publication Data
US 2015/0336582 A1 Nov. 26, 2015

(30) Foreign Application Priority Data

Dec. 26, 2012 (KR) .................. 10-2012-0153264

(51) Int. Cl.
*F02D 29/04* (2006.01)
*F02D 29/06* (2006.01)
(Continued)

(52) U.S. Cl.
CPC ........ *B60W 30/1882* (2013.01); *B60W 10/06* (2013.01); *B60W 10/30* (2013.01);
(Continued)

(58) Field of Classification Search
CPC .......... F02D 29/00; F02D 29/04; F02D 29/06; F02D 41/04; F02D 41/14; B60K 6/20;
(Continued)

(56) References Cited

U.S. PATENT DOCUMENTS 6,881,165 B2* 4/2005 Endo ................. B60K 6/48
417/350
8,249,765 B2* 6/2012 Tanaka et al. ........ B60W 20/13
180/65.21
(Continued)

FOREIGN PATENT DOCUMENTS

JP 11-002144 A 1/1999
JP 2011-111934 A 6/2011
(Continued)

OTHER PUBLICATIONS

English machine translation of JP 2011117398 A provided by ESPACENET.*
(Continued)

*Primary Examiner* — Jacob M Amick
*Assistant Examiner* — Michael A Kessler
(74) *Attorney, Agent, or Firm* — John D. Veldhuis-Kroeze; Westman, Champlin & Koehler, P.A.

(57) ABSTRACT

The present disclosure relates to an engine control device for hybrid construction machinery, and more particularly, and an object of the present disclosure is to, in a hybrid excavator, in which a swing apparatus is electrically driven by being separated from a hydraulic power train system in the related art, satisfy a minimum rotational speed of an engine auxiliary motor which is necessary to satisfy a target charging amount required for an energy storage device, and improve fuel efficiency by removing unnecessary energy loss at low loads by controlling a rotational speed of an engine to be lower than a rotational speed of an engine
(Continued)

determined based on a dial input and a mode input in the related art, in a case where a target power generation amount of the engine auxiliary motor is small in a low-load work situation.

3 Claims, 4 Drawing Sheets

(51) Int. Cl.
*B60W 20/15* (2016.01)
*B60W 30/188* (2012.01)
*B60W 20/13* (2016.01)
*E02F 9/26* (2006.01)
*E02F 9/20* (2006.01)
*B60W 20/16* (2016.01)
*B60W 10/06* (2006.01)
*B60W 10/30* (2006.01)
*B60W 50/00* (2006.01)

(52) U.S. Cl.
CPC ............ *B60W 20/13* (2016.01); *B60W 20/15* (2016.01); *B60W 20/16* (2016.01); *B60W 30/1886* (2013.01); *E02F 9/2075* (2013.01); *E02F 9/2091* (2013.01); *E02F 9/26* (2013.01); *F02D 29/04* (2013.01); *F02D 29/06* (2013.01); *B60W 2050/0011* (2013.01); *B60W 2300/17* (2013.01); *B60W 2510/0638* (2013.01); *B60W 2510/305* (2013.01); *B60W 2710/244* (2013.01); *B60Y 2200/41* (2013.01); *B60Y 2200/412* (2013.01); *Y02T 10/6286* (2013.01); *Y10S 903/903* (2013.01)

(58) Field of Classification Search
CPC .......... B60L 1/003; B60L 11/02; B60L 11/12; B60L 2260/54; B60W 10/06; B60W 10/08; B60W 10/26; B60W 10/30; B60W 20/00; B60W 20/30; B60W 20/13; B60W 20/11; B60W 20/10; B60W 2510/242; B60W 2510/0638; B60W 2540/04; B60W 2710/0644; B60W 2710/065; B60W 2710/0661; F02F 9/00; F02F 9/123; F02F 9/2075; F02F 9/2246; F02F 9/20; Y02T 10/6286
USPC ... 180/65.265, 65.27, 65.235, 65.275, 65.28, 180/65.285, 65.29; 701/36, 54; 318/139
See application file for complete search history.

(56) References Cited

U.S. PATENT DOCUMENTS

| 8,534,264 | B2* | 9/2013 | Kawaguci et al. ...... B60K 6/48 417/350 |
| 8,948,950 | B2* | 2/2015 | Saito .................... B60W 20/13 180/65.21 |

FOREIGN PATENT DOCUMENTS

| JP | 2011-117398 A | | 6/2011 | |
| JP | 2011117398 A | * | 6/2011 | ............ F02D 29/06 |
| JP | 2012-017675 A | | 1/2012 | |
| JP | WO 2012114429 A1 | * | 8/2012 | ............ B60K 6/445 |
| KR | 10-1199244 B1 | | 11/2012 | |

OTHER PUBLICATIONS

Human Translation of JP 2011117398 A Osuga Tadao.*
International Search Report and English Translation dated Mar. 26, 2014 for corresponding International Application No. PCT/KR2013/012066, 5 pages.

* cited by examiner

Fig. 5
TARGET ENGINE ROTATIONAL
SPEED IN THE RELATED ART
FOR HYBRID EXCAVATOR
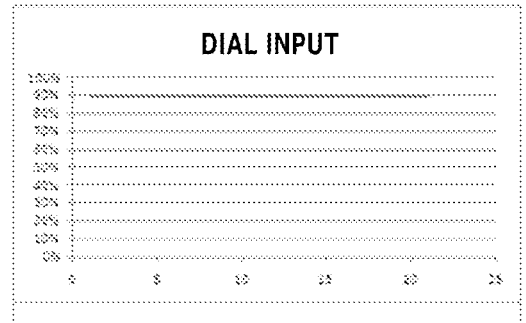
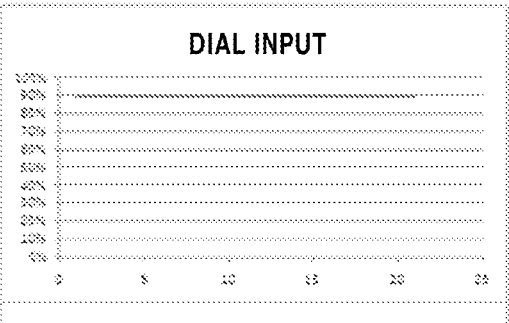
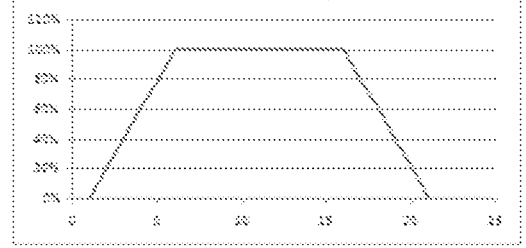
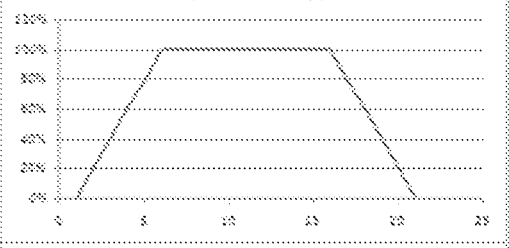
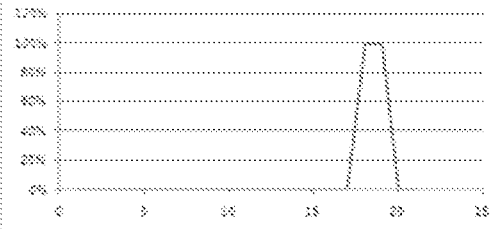
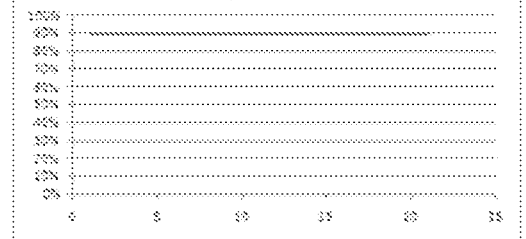
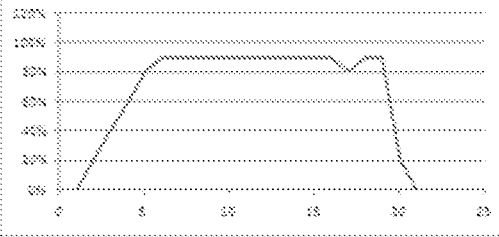

ENGINE CONTROL DEVICE FOR HYBRID CONSTRUCTION MACHINERY

CROSS-REFERENCE TO RELATED APPLICATION

This Application is a Section 371 National Stage Application of International Application No. PCT/KR2013/012066, filed Dec. 24, 2013 and published, not in English, as WO 2014/104698 A1 on Jul. 3, 2014.

FIELD OF THE DISCLOSURE

The present disclosure relates to an engine control device for hybrid construction machinery, and more particularly, to an engine control device for hybrid construction machinery, which is capable of reducing an engine rotational speed in accordance with low pump loads and a low target power generation amount of an engine auxiliary motor in order to maximize fuel efficiency of hybrid construction machinery including an electric swing apparatus.

BACKGROUND OF THE DISCLOSURE

Recently, researches on hybrid type construction machinery, which improves fuel efficiency by storing surplus power of an engine in a battery, and supplying power from the battery to the engine that does not have sufficient power so as to cope with an rapid increase in oil price, are being actively conducted.

A system, which uses the engine and an electric motor as a common power source as described above, and has an electrical energy storage device, is referred to as a hybrid system. For example, as the hybrid system, there is a hybrid system for heavy equipment, such as a hybrid vehicle and an excavator.

In the meantime, a general excavator system uses an engine as a power source and serves to swing or move a boom, an arm, and a bucket, which are final loads, by means of hydraulic pressure. On the contrary, in the case of a hybrid excavator system, a motor and an electricity storage device are additionally installed in a general excavator, thereby improving overall efficiency of the excavator system.

FIG. 1 is a configuration diagram of a hybrid excavator, in which a swing apparatus is driven by electricity by being separated from a hydraulic power train system in the related art.

As illustrated in FIG. 1, a swing motor 70 is driven by receiving electric energy from an energy storage device 60, and the energy storage device 60 receives electric power from an engine auxiliary motor 20. In a situation where the swing motor 70 decelerates, kinetic energy of the swing apparatus is regenerated to the energy storage device 60, and regarding electric power that is lost due to friction and the like, the engine auxiliary motor 20 supplies electric power to maintain a voltage of the energy storage device 60 to maintain at an appropriate level. In the meantime, an engine 10, a pump 30, a control valve 40, and a boom/arm/bucket traveling operator 50 are the same components as those provided in an engine type excavator in the related art.

The engine of the excavator in the related art is controlled so as to receive a target engine rotational speed from a dial input of a driver and a mode input switch (for example, a power (P) mode, a standard (S) mode, and an economy (E) mode) as illustrated in FIG. 2 and maintain the received target engine rotational speed with a predetermined uniform value. Accordingly, the engine is driven at a predetermined rotational speed regardless of a load size, so that unnecessary energy loss is generated in low load work.

In the meantime, in the hybrid excavator in which the swing apparatus is electrically driven by being separated from the hydraulic power train system in the related art as illustrated in FIG. 1, the swing motor 70 receives electric energy from the energy storage device 60 to be driven. In the aforementioned hybrid excavator, a load is not generated in the engine during the turning operation, so that, in a representative work mode, in which excavation-turning-dump operations are repeated, a time, for which a high load is applied to the engine, is shorter than that of the engine type excavator in the related art. Accordingly, when a method of controlling a rotational speed of an engine in the related art is applied, the hybrid excavator has larger energy loss due to an unnecessarily high rotational speed of the engine at low load work, compared to the engine type excavator in the related art.

However, in the hybrid excavator of FIG. 1, in order to maintain a voltage of the energy storage device 60 at an appropriate level, the engine auxiliary motor 20 driven at the same rotational speed of that of the engine 10 needs to generate a sufficient power generation voltage while rotating at an appropriate speed or more. This means that in the hybrid excavator, a rotational speed of the engine needs to be maintained high in order to charge the energy storage device 60 even under low load work, differently from the engine type excavator in the related art.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter.

The present disclosure is conceived so as to solve the problems in the related art, and an object of some embodiments of the present disclosure is to, in a hybrid excavator, in which a swing apparatus is electrically driven by being separated from a hydraulic power train system in the related art, satisfy the minimum rotational speed of the engine auxiliary motor which is necessary to satisfy a target charging amount required for an energy storage device, and improve fuel efficiency by removing unnecessary energy loss at low loads by controlling a rotational speed of an engine to be lower than a rotational speed of an engine determined based on a dial input and a mode input in the related art, in a case where a target power generation amount of an engine auxiliary motor is small in a low-load work situation.

In order to achieve the aforementioned object, for a target engine rotational speed according to a torque of a pump, the present disclosure sets a minimum rotational speed for a target output quantity of a power generator as a lower limit value and sets a target rotational speed determined based on a dial input and a mode input in the related art as an upper limit value, thereby calculating a final target engine rotational speed.

More particularly, the present disclosure provides an engine control device for hybrid construction machinery which comprises an engine, an engine auxiliary motor, an energy storage device, a swing motor, and a pump operating an operator, which performs work other than a swing operation, by using driving power of the engine, the engine control device including: a first target engine rotational speed calculation unit configured to calculate a first target engine rotational speed of the engine based on a dial input value and a work mode input value which are information about the rotational speed of the engine; a second target engine rotational speed calculation unit configured to calculate a second target rotational speed of the engine based on a target power generation amount of the engine auxiliary motor; and an engine speed determination unit configured to compare a calculation value of the calculated first target engine rotational speed and a calculation value of the calculated second target engine rotational speed, and determine a minimum value as a final target engine rotational speed.

The present disclosure may further include a third target engine rotational speed calculation unit configured to calculate a third target engine rotational speed of the engine based on a torque of the pump, in which the engine speed determination unit may include a maximum value calculation unit configured to compare the calculation value of the calculated second target engine rotational speed with a calculation value of the calculated third target engine rotational speed and calculate a maximum value. Also, the engine speed determination unit may include a minimum value calculation unit configured to compare the calculation value of the calculated first target engine rotational speed with the maximum value calculated by the maximum value calculation unit, to calculate a minimum value, to determine the calculated minimum value as a final target engine rotational speed.

The third target engine rotational speed calculation unit may apply a hysteresis to a relationship between a torque of the pump and the target rotational speed of the engine by setting the torque of the pump at a time point, at which the target rotational speed of the engine increases, to be larger than the torque of the pump at a time point, at which the target rotational speed of the engine decreases.

The present disclosure may further include a proportion-integration-differentiation (PID) controller configured to calculate a target power generation amount of the engine auxiliary motor based on a voltage and a target voltage of the energy storage device.

The engine control device for hybrid construction machinery according to the present disclosure may satisfy a minimum rotational speed of an engine auxiliary motor which is necessary to satisfy a target charging amount required for an energy storage device, and improve fuel efficiency by removing unnecessary energy loss at low loads by controlling a rotational speed of an engine to be lower than a rotational speed of an engine determined based on a dial input and a mode input in the related art in a case where a target power generation amount of the engine auxiliary motor is small in a low-load work situation in hybrid construction machinery in which a swing apparatus is electrically driven by being separated from a hydraulic power train system in the related art.

DESCRIPTION OF THE DRAWINGS

FIG. 5 is a diagram of a comparison between a control of the rotational speed of an engine in the related art and a control of the rotational speed of the engine according to the present disclosure.

Figure 1:
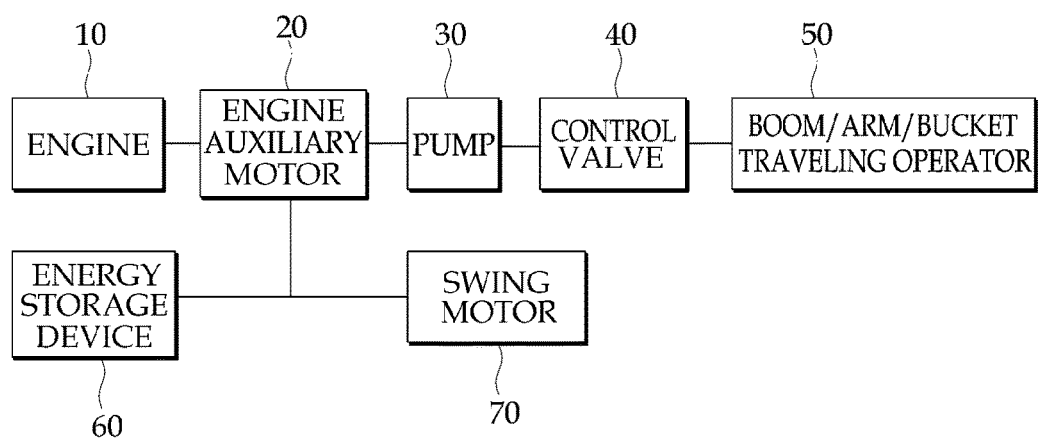
FIG. 1 is a configuration diagram of a hybrid excavator, in which a swing apparatus is driven by electricity by being separated from a hydraulic power train system in the related art.

Description of Main Reference Numerals of the Drawings

10: Engine  20: Engine auxiliary motor
30: Pump  40: Control valve
50: Boom/arm/bucket traveling operator
60: Energy storage device  70: Swing motor
100: First target engine rotational speed calculation unit
200: Second target engine rotational speed calculation unit
300: Third target engine rotational speed calculation unit
400: PID controller  500: Maximum value calculation unit
600: Minimum value calculation unit

DETAILED DESCRIPTION

Hereinafter, an exemplary embodiment of the present disclosure will be described in detail with reference the accompanying drawing. A configuration of the present disclosure and an operational effect according to the configuration of the present disclosure will be clearly understood by the detailed description below. In the following detailed description, the same elements will be designated by the same reference numerals even though the elements are illustrated in different drawings, and a detailed explanation of publicly known related configurations may be omitted so as to avoid unnecessarily obscuring the subject matter of the present disclosure.

The present disclosure is applied to hybrid construction machinery, in which a swing apparatus illustrated in FIG. 1 is driven by electricity by being separated from a hydraulic power train system in the related art.

That is, the present disclosure is applicable to hybrid construction machinery, which includes an engine 10, an engine auxiliary motor 20 driven by the engine 10, an energy storage device 60 for storing energy received from the engine auxiliary motor 20, a swing motor 70 driven by electric energy of the energy storage device 60, and a pump 30 operating an operator 50 through a control valve 40, which performs work other than a swing operation, by using driving power of the engine 10 as illustrated in FIG. 1.

Figure 3:
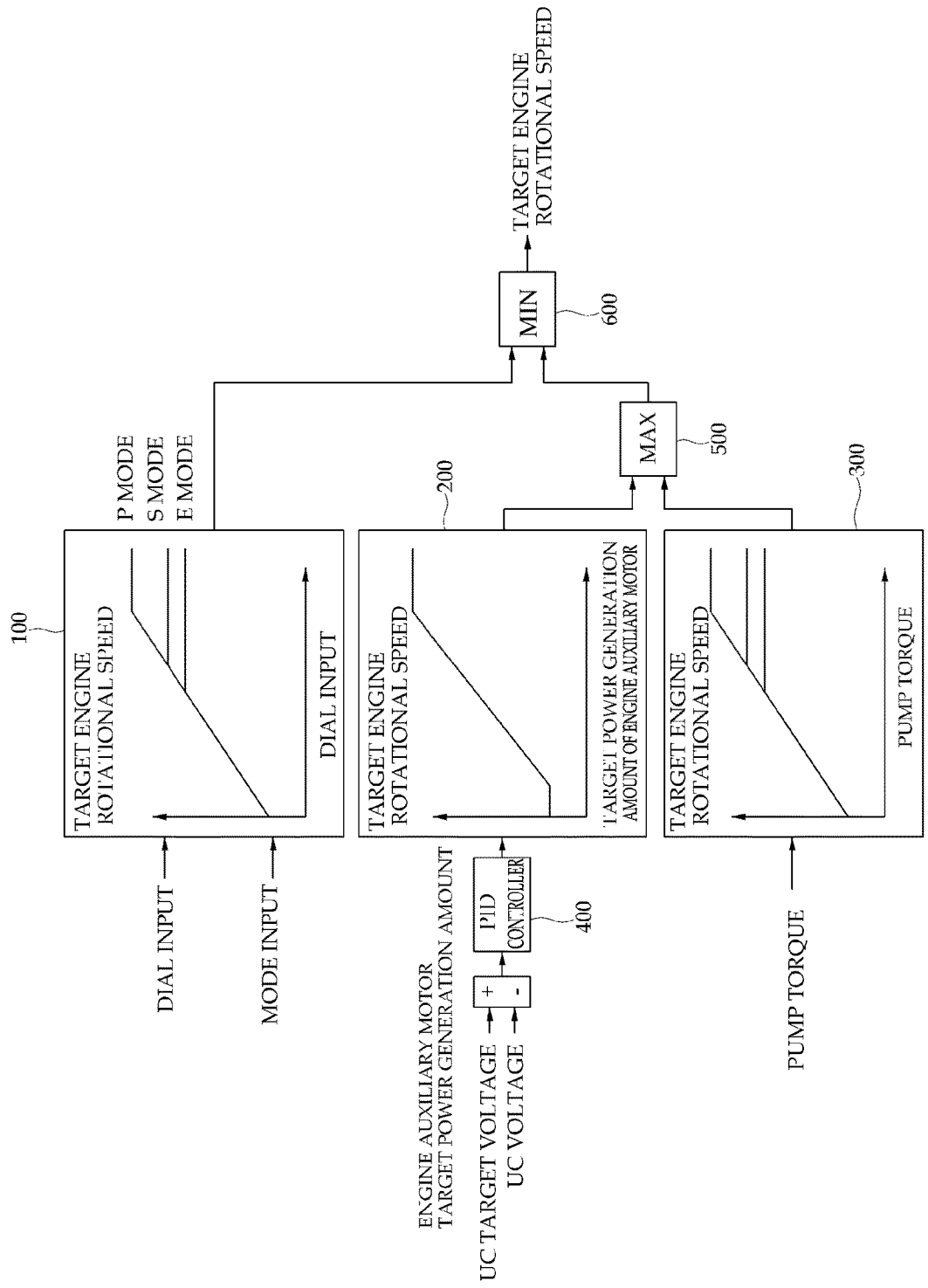
FIG. 3 is a configuration diagram of an engine control device for hybrid construction machinery according to the present disclosure.

FIG. 3 is a configuration diagram of an engine control device for hybrid construction machinery according to the present disclosure.

As illustrated in FIG. 3, the engine control device for hybrid construction machinery according to the present disclosure includes a first target engine rotational speed calculation unit 100, a second target engine rotational speed calculation unit 200, a third target engine rotational speed calculation unit 300, and engine speed calculation units 500 and 600. Here, the engine speed calculation units 500 and 600 include a maximum value calculation unit 500 and a minimum value calculation unit 600.

Figure 2:
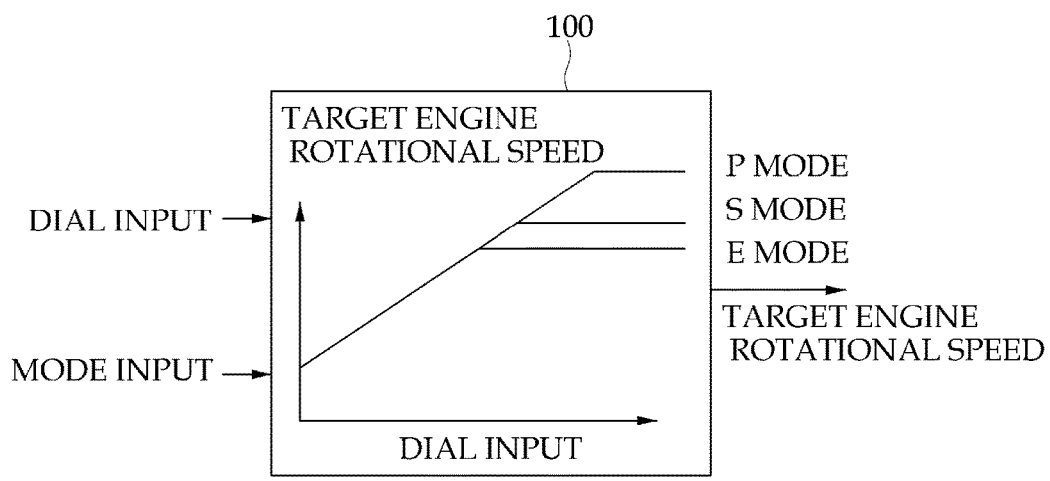
FIG. 2 is a block diagram of a control of an engine rotational speed in the related art.

The engine control device for hybrid construction machinery according to the present disclosure includes the first target engine rotational speed calculation unit 100, which calculates a first target engine rotational speed of the engine 10 based on a dial input value and a work mode input value that are information about the rotational speed of the engine 10 applied for the control of the rotational speed of the engine in the related art illustrated in FIG. 2, the second target engine rotational speed calculation unit 200 which calculates a second target engine rotational speed of the engine 10 based on a target power generation amount of the engine auxiliary motor 20, the third target engine rotational speed calculation unit 300 which calculates a third target engine rotational speed of the engine 10 based on a torque of the pump 30, and the engine speed calculation units 500 and 600.

Here, in describing the engine speed calculation units 500 and 600 in detail, the minimum value calculation unit 600 compares a calculation value of the first target engine rotational speed calculated by the first target engine rotational speed calculation unit 100 with a calculation value of the second target engine rotational speed calculated by the second target engine rotational speed calculation unit 200, and determines a minimum value as a final target engine rotational speed.

In the meantime, investigating an example, in which the third target engine rotational speed is considered, the maximum value calculation unit 500 compares a calculation value of the second target engine rotational speed calculated by the second target engine rotational speed calculation unit 200 with a calculation value of the third target engine rotational speed calculated by the third target engine rotational speed calculation unit 300 and calculates a maximum value. Further, the minimum value calculation unit 600 may compare a calculation value of the first target engine rotational speed calculated by the first target engine rotational speed calculation unit 100 and the maximum value calculated by the maximum value calculation unit 500, and determine a minimum value as a final target engine rotational speed.

That is, for a target engine rotational speed of the torque of the pump, the present disclosure may set a minimum rotational speed for a target output quantity of a power generator as a lower limit value, and set the target rotational speed determined based on the dial input and the mode input in the related art as an upper limit value, through the minimum value calculation unit 600 and the maximum value calculation unit 500, thereby calculating a final target engine rotational speed.

In the meantime, a PID controller 400 is provided at an input terminal of the second target engine rotational speed calculation unit 200, so that a target power generation amount of the engine auxiliary motor 20 is calculated based on the voltage and a target voltage of the energy storage device 60.

Here, the target power generation amount of the engine auxiliary motor 20 for charging the energy storage device 60 in the hybrid construction machinery of FIG. 1 is for the purpose of compensating for a difference between a target voltage of the energy storage device 60 and an actual voltage of the energy storage device 60, and in order to output a target power generation amount of the auxiliary motor 20, the rotational speed of the engine needs to be maintained larger than a minimum rotational speed determined based on Equation 1 below.

$$\text{Minimum rotational speed of engine} = \frac{\text{Target output of engine auxilairy motor}}{\text{Rated torque of engine auxiliary motor}} \quad \text{[Equation 1]}$$

A process of operating the engine control device of the present disclosure according to the above configuration will be described.

First, the first target engine rotational speed calculation unit 100 calculates a first target engine rotational speed based on a dial input value and a driving mode input value (for example, a power (P) mode, a standard (S) mode, and an economy (E) mode) for the rotational speed of the engine input by a user.

The PID controller 400 is provided to calculate a target power generation amount of the engine auxiliary motor 20 based on a voltage and a target voltage of the energy storage device 60, and then transmits the calculated target power generation amount to the input terminal of the second target engine rotational speed calculation unit 200.

The second target engine rotational speed calculation unit 200 calculates a second target engine rotational speed based on a value of the target power generation amount of the engine auxiliary motor 20 received from the PID controller 400.

The third target engine rotational speed calculation unit 300 calculates a third target engine rotational speed of the engine 10 based on a torque of the pump 30.

In a case in which the third target engine rotational speed is considered, the maximum value calculation unit 500 calculates a maximum value between the calculation value of the second target engine rotational speed calculation unit 200 and the calculation value of the third target engine rotational speed calculation unit 300.

Next, the minimum value calculation unit 600 calculates a minimum value between the calculation value of the first target engine rotational speed calculation unit 100 and the calculation value of the maximum value calculation unit 500, and then determines the calculation value of the minimum value calculation unit 600 as a final target engine rotational speed.

Figure 4:
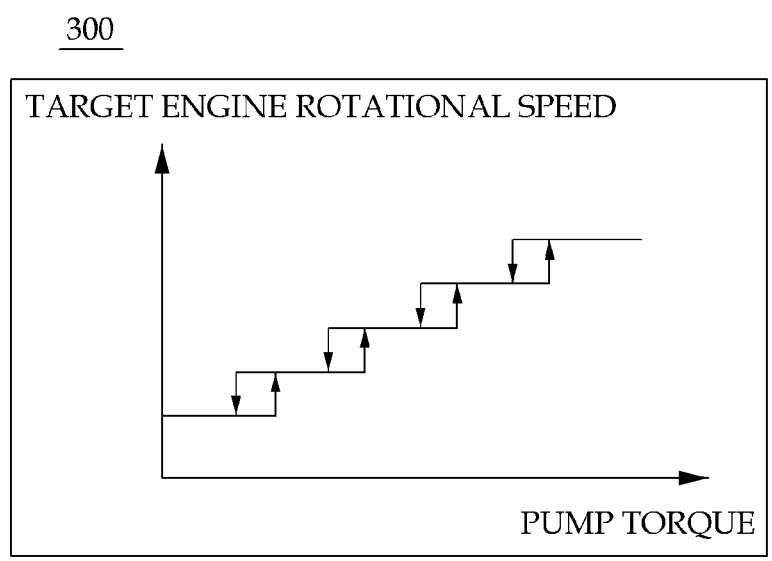
FIG. 4 is a diagram of a control of the rotational speed of an engine according to a torque of a pump of FIG. 3.

In the meantime, as illustrated in FIG. 4, when calculating a target rotational speed of the engine 10 based on the torque of the pump 30, the third target engine rotational speed calculation unit 300 calculates a target rotational speed of the engine based on a diagram of a target engine rotational speed to a torque of the pump of FIG. 4 so that the rotational speed of the engine is decreased during low load work based on torque information obtained by calculating a size of a load applied to the engine based on a pump pressure and a swivel angle. Construction equipment, such as construction machinery, has a large variation width of a torque of a pump and a large variation speed, so that when a target rotational speed of the engine is changed according to a load, there is a problem in that the rotational speed of the engine is hunted.

In order to solve the program, noise and vibration generated by the hunting of the rotational speed of the engine may be prevented by applying a hysteresis at a time point, at which a torque of the pump is changed from a low load to a high load and from a high load to a low load as illustrated in FIG. 4. That is, the third target engine rotational speed calculation unit 300 applies the hysteresis to a relationship between the torque of the pump and the target rotational speed of the engine by setting the torque of the pump at a time point, at which the target rotational speed of the engine increases to be larger than the torque of the pump at a time point, at which the target rotational speed of the engine decreases.

In the meantime, when the torque of the pump sharply increases from a low load to a high load, so that a sharp increase of the rotational speed of the engine is demanded, the engine auxiliary motor performs a motoring operation to make the rotational speed of the engine be rapidly returned.

For the target engine rotational speed according to the pump torque, a minimum rotational speed for a target output mount of the power generator is set as a lower limit value, and a target rotational speed determined based on the dial input and the mode input in the related art is set as an upper limit value, thereby calculating a final rotational speed of the engine.

FIG. 5 is a comparison diagram to which a method of controlling the rotational speed of the engine in the related art and a method of controlling the rotational speed of the engine according to the present disclosure are applied.

In a method of controlling the rotational speed of an engine in the related art, when a dial input value is uniform, a speed of the engine is uniformly maintained regardless of a load.

By contrast, when a method of controlling an engine of hybrid construction machinery is applied, even though a dial input value is uniform, a target rotational speed of the engine is increased or decreased according to a size of a torque of the pump related to the load. That is, when the size of the torque of the pump is increased, a target rotational speed of the engine is increased, and when the size of the torque of the pump is decreased, a target rotational speed of the engine is decreased. Further, a target rotational speed of the engine may be uniformly maintained according to a correlation rate between the dial input value and the size of the torque of the pump.

Further, as illustrated in FIG. 5, it can be seen that when a target power generation amount of the engine auxiliary motor 20 is generated, a target rotational speed of the engine is decreased by the generated target power generation amount of the engine auxiliary motor 20.

From the foregoing, it will be appreciated that the exemplary embodiments of the present disclosure have been described herein for purposes of illustration, and that various modifications may be made by those skilled in the art without departing from the scope of the present disclosure. The exemplary embodiments disclosed in the specification of the present disclosure will not limit the present disclosure. The scope of the present disclosure shall be construed on the basis of the following claims, and it shall be construed that all of the technical ideas included within the scope equivalent to the claims belong to the present disclosure.

The invention claimed is:

1. An engine control device for hybrid construction machinery which includes an engine, an engine auxiliary motor, an energy storage device, a swing motor, and a pump operating an operator, which performs work other than a swing operation, by using driving power of the engine, the engine control device comprising:
   a first target engine rotational speed calculation unit configured to calculate a first target engine rotational speed of the engine based on a dial input value and a work mode input value which are inputted by a driver;
   a second target engine rotational speed calculation unit configured to calculate a second target rotational speed of the engine based on a target power generation amount of the engine auxiliary motor;
   a third target engine rotational speed calculation unit configured to calculate a third target engine rotational speed of the engine based on a torque of the pump; and
   an engine speed calculation unit configured to determine one of the first target engine rotational speed, the second target engine rotational speed and the third target engine rotational speed as a final target engine rotational speed; and
      wherein the engine speed calculation unit determines the first target engine rotational speed as the final target engine rotational speed when the greater one of the second target engine rotational speed and the third target engine rotational speed is greater than the first target engine rotational speed, and
      the engine speed calculation unit determines the greater one of the second target engine rotational speed and the third target engine rotational speed as the final target engine rotational speed when the greater one of the second target engine rotational speed and the third target engine rotational speed is less than the first target engine rotational speed.

2. The engine control device of claim 1, wherein the third target engine rotational speed calculation unit applies a hysteresis to a relationship between a torque of the pump and the target rotational speed of the engine by setting the torque of the pump at a time point, at which the target rotational speed of the engine increases, to be larger than the torque of the pump at a time point, at which the target rotational speed of the engine decreases.

3. The engine control device of claim 1, further comprising: a PID controller configured to calculate a target power generation amount of the engine auxiliary motor based on a voltage and a target voltage of the energy storage device.

* * * * *